United States Patent
Newcomer

(10) Patent No.: US 6,360,419 B1
(45) Date of Patent: Mar. 26, 2002

(54) GARBAGE DISPOSAL SPLIT-RING INSERTION DEVICE

(76) Inventor: Edward Orton Newcomer, 627 Sonoma St., Richmond, CA (US) 94805

( * ) Notice: Subject to any disclaimer, the term of this patent is extended or adjusted under 35 U.S.C. 154(b) by 0 days.

(21) Appl. No.: 09/638,312

(22) Filed: Aug. 14, 2000

(51) Int. Cl.$^7$ ............................................. B23P 11/02
(52) U.S. Cl. ........................ 29/451; 29/225; 29/229; 29/235; 29/263; 29/450; 29/453
(58) Field of Search ........................ 29/225, 227, 229, 29/235, 263, 280, 282, 450, 451, 453

(56) References Cited

U.S. PATENT DOCUMENTS

| | | | | |
|---|---|---|---|---|
| 2,360,054 | A | * 10/1944 | Haas | 72/392 |
| 2,760,258 | A | * 8/1956 | Rieger | 29/229 |
| 3,154,256 | A | * 10/1964 | Bebinger | 241/46.016 |
| 3,896,537 | A | * 7/1975 | Freeman | 29/235 |
| 3,982,703 | A | * 9/1976 | Meyers | 241/46.015 |
| 4,015,325 | A | * 4/1977 | Theobald et al. | 29/451 |
| 5,285,568 | A | * 2/1994 | Johann et al. | 29/809 |
| 5,584,110 | A | * 12/1996 | Mordoch | 29/229 |
| 5,601,540 | A | * 2/1997 | Stevens | 604/283 |
| 5,617,620 | A | * 4/1997 | Weuster et al. | 29/229 |
| 5,875,536 | A | * 3/1999 | Ring | 29/407.1 |
| 5,956,830 | A | * 9/1999 | Imbus et al. | 29/235 |

* cited by examiner

Primary Examiner—S. Thomas Hughes
Assistant Examiner—Essama Omgba
(74) Attorney, Agent, or Firm—Risto A. Rinne, Jr.

(57) ABSTRACT

An apparatus for installing a split-ring on a sink flange to install a garbage disposer unit includes a first cylindrical member that is disposed co-axially with respect to a second cylindrical member. The cylindrical members are adapted for at least limited longitudinal movement with respect to each other. The first cylindrical member is used to temporarily retain the split-ring in an expanded position proximate an annular groove that is provided in the sink flange. The second cylindrical member is used to displace the split-ring off of the first cylindrical member and onto the annular groove of the sink flange where it is needed to complete installation of the garbage disposer. According to a preferred embodiment the first and second cylindrical members are not attached to each other and final installation of the snap-ring to the sink flange is accomplished by applying a downward pressure to the sink flange from above the sink while supporting the device from below the sink. According to a modification, a first modified cylindrical member is attached to a second modified cylindrical member by a rod that passes through a pair of slots in the first modified cylindrical member and final installation is accomplished by applying an upward force to the first modified cylindrical member from above the sink.

10 Claims, 2 Drawing Sheets

GARBAGE DISPOSAL SPLIT-RING INSERTION DEVICE

BACKGROUND OF THE INVENTION

1. Field of the Invention

The present invention, in general relates to garbage disposal devices and, more particularly, to devices that aid in the insertion of a split-ring onto an annular groove of a sink flange component of the garbage disposal.

The installation of garbage disposals on sinks is a difficult matter because a significant portion of the operation must be performed while the installer is under the sink. The word "disposer" is sometimes used interchangeably with the word "disposal" in the plumbing industry and therefore, the instant invention appertains regardless of which word is used or preferred. For purposes of consistency throughout the specification, the word "disposal" has been selected.

In particular, one of the most difficult aspects associated with the installation of a garbage disposal unit is that of mounting a split-ring, sometimes also called a "snap ring" onto an annular groove of a sink flange.

It is necessary to first place the sink flange through a sink drain hole and to then align several component parts in proper sequence over the sink flange from under the sink. The installer must then somehow expand the split-ring and force it up and over the sink flange until it aligns with the annular groove and snaps into the annular groove.

Once it is in the annular groove, it is secure and able to retain the component parts that were placed above it over the sink flange. These component parts are disposed intermediate the split-ring and the underside of the sink and they are used to secure both the sink flange to the sink drain hole and then to secure (i.e., to hang) the actual garbage disposal unit from the sink flange. The split-ring ultimately ends up bearing the entire weight of the garbage disposal unit.

The great difficulty in the installation of the split-ring is, in reality, complicated by a number of factors. First, as mentioned hereinabove, the installer must properly align several component parts above the split-ring. He must then apply considerable upward force to the sink flange as he expands the split-ring so that it will fit over the sink flange (bottom), and he must then push it up along the longitudinal length of the sink flange until it reaches the annular groove in the sink flange.

As there is nothing to retain the sink flange in position, pushing the split-ring over the sink flange in an upward direction tends to raise (i.e., displace) the sink flange from the sink drain hole instead of having the split-ring ride up the sink flange, as intended.

Installers often work in pairs for this very reason. One of them stands above the sink drain hole and applies a downward force to hold the sink flange in the sink drain hole while the installer under the sink pushes the split-ring upwards.

Clearly, having a second installer present for one operation adds considerable expense to the process. Even with the availability of the second installer to hold the sink flange in place, the task of expanding the split-ring and pushing it on the sink flange from under the sink is arduous.

The area under a sink is often cramped and offers limited access at best. The installer may, therefore, not be able to push the split-ring straight up but may have to work and apply pressure at an angle. The light is limited and conditions are painful. It is not easy to lay under a sink on one's back. All of these factors together compound significantly the difficulties associated with installation of garbage disposal units generally and more specifically, the installation of the split-ring onto the annular groove of the sink flange.

It clearly is desirable to be able to readily install the split-ring onto the sink flange without the need of a second installer to hold the sink flange in the sink drain hole.

It is also desirable to be able to install the split-ring onto the sink flange while the installer is standing upright and reaching down through the sink drain hole.

The only known prior art device (the patent is specified hereinafter under section number "2") to aid in the installation of a split-ring relies upon a plurality of spring and ball detents to hold the device in position. These small component parts can rust or accumulate dirt and debris, thereby adversely affecting use of the device.

It is desirable to have a tool that is easy to use and which does not include small component parts that are likely to stick or bind.

Ideally, such a device would be inexpensive to manufacture and could be sold as an after-market tool or mass produced and included with each garbage disposal unit that is manufactured.

In addition, certain types of sinks such as cast iron sinks are especially difficult to install the split-ring onto the annular groove because of the shape and thickness of the area proximate the sink drain hole.

Accordingly, there exists today a need for a garbage disposal split-ring insertion device that is reliable, inexpensive to manufacture, has no springs or small parts of its own that are likely to become inoperative, and which eliminates the need for a second installer, is adapted for use with a great variety of types of sinks, and which allows the installer to work from a position that is disposed above and outside, rather than entirely from beneath, the sink.

Clearly, such an apparatus would be a useful and desirable device.

2. Description of Prior Art

Split ring insertion devices are, in general, known. For example, the following patents describe various types of these devices:

U.S. Pat. No. 5,285,568 to Johann et al, Feb. 15, 1994; and
U.S. Pat. No. 5,584,110 to Mordoch, Dec. 17, 1996.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a garbage disposal split-ring insertion device that is inexpensive to manufacture.

It is also an important object of the invention to provide a garbage disposal split-ring insertion device that can assist in the installation of a split-ring onto the annular groove of a sink flange.

Another object of the invention is to provide a garbage disposal split-ring insertion device that permits an installer to apply the split-ring to the sink flange while working from a position that is disposed primarily outside of the sink cabinet area.

Still another object of the invention is to provide a garbage disposal split-ring insertion device that can eliminate the need for a second installer to assist in the installation process.

Still yet another object of the invention is to provide a garbage disposal split-ring insertion device that allows for smooth and easy insertion of the split-ring onto the tool itself.

Yet another important object of the invention is to provide a garbage disposal split-ring insertion device that does not require an independent mechanical attachment to the sink flange in order for it to be used.

Yet another substantial important object of the invention is to provide a garbage disposal split-ring insertion device that does not utilize springs or balls to secure it to the sink flange.

Still yet another important object of the invention is to provide a garbage disposal split-ring insertion device that is reliable to use.

Still yet one other important object of the invention is to provide a garbage disposal split-ring insertion device that is adapted for use with all types of sinks.

Still yet one other especially important object of the invention is to provide a garbage disposal split-ring insertion device that is adapted for use with cast iron types of sinks.

It is an especially valuable and important object of the present invention to provide a garbage disposal split-ring insertion device that can lessen the time that is required to complete the installation of a garbage disposer unit in a sink.

Briefly, a garbage disposal split-ring insertion device apparatus for use in installing a split-ring on a sink flange installed in a drain hole of a sink that is constructed in accordance with the principles of the present invention has a first cylindrical member disposed co-axially within a second cylindrical member. The cylindrical members are adapted for limited longitudinal movement with respect to each other. According to a preferred embodiment, the first cylindrical member includes a first section that aligns with the sink flange by passing concentrically inside the bottom thereof. The first section includes a recess at a lower end that is adapted to receive the bottom of the sink flange at a predetermined depth therein. When the sink flange is disposed properly in the recess an outer edge of the recess aligns just below a first annular groove of the sink flange. The outer edge of the first cylindrical member includes a first conical taper that has at a bottom end, its smallest outside diameter which is less than the contracted inside diameter of a split-ring. The split-ring is placed over the bottom end and is manually pushed up and over the first conical taper. As it does so it expands because the maximum outside diameter of the conical taper is greater than the maximum outside diameter of the first annular groove. The maximum diameter areas of the first conical taper are disposed proximate the recess and also the outer edge. The first cylindrical member also includes a second annular groove proximate the outer edge that is adapted to receive and retain the split-ring in an expanded position. In use, the split-ring is applied over the first conical taper until it reaches the second annular groove. The second cylindrical member includes a second conical taper that, at a larger inside diameter end, exceeds the maximum outside diameter of the first conical taper but is less than the outside diameter of the expanded (i.e., extended) split-ring when the split-ring is disposed in the second annular groove. The sink flange is then placed in the drain hole. The first cylindrical member (with the split-ring attached thereto on the second annular groove) is placed into the larger diameter end of the second conical taper and is held up and aligned with the bottom of the sink flange from under the sink (after having first placed some additional parts of a garbage disposer unit over the sink flange from under the sink and intermediate the device). The sink flange is then pressed down from above the sink using one hand of an installer while the remaining hand is used to support the device which enters into and properly aligns with the sink flange. Additional force is applied to the sink flange which then causes the split-ring to be displaced off of the second annular groove and to travel past the outer edge of the first conical taper and onto the first annular ring of the sink flange where it contracts into position and thereby secures the sink flange and the additional parts to the sink. According to a modification, herein described, a modified first cylindrical member is attached to a modified second cylindrical member that is pulled upward from above the sink while applying downward pressure to retain the sink flange in the sink drain hole.

DETAILED DESCRIPTION OF THE INVENTION

Figure 1:
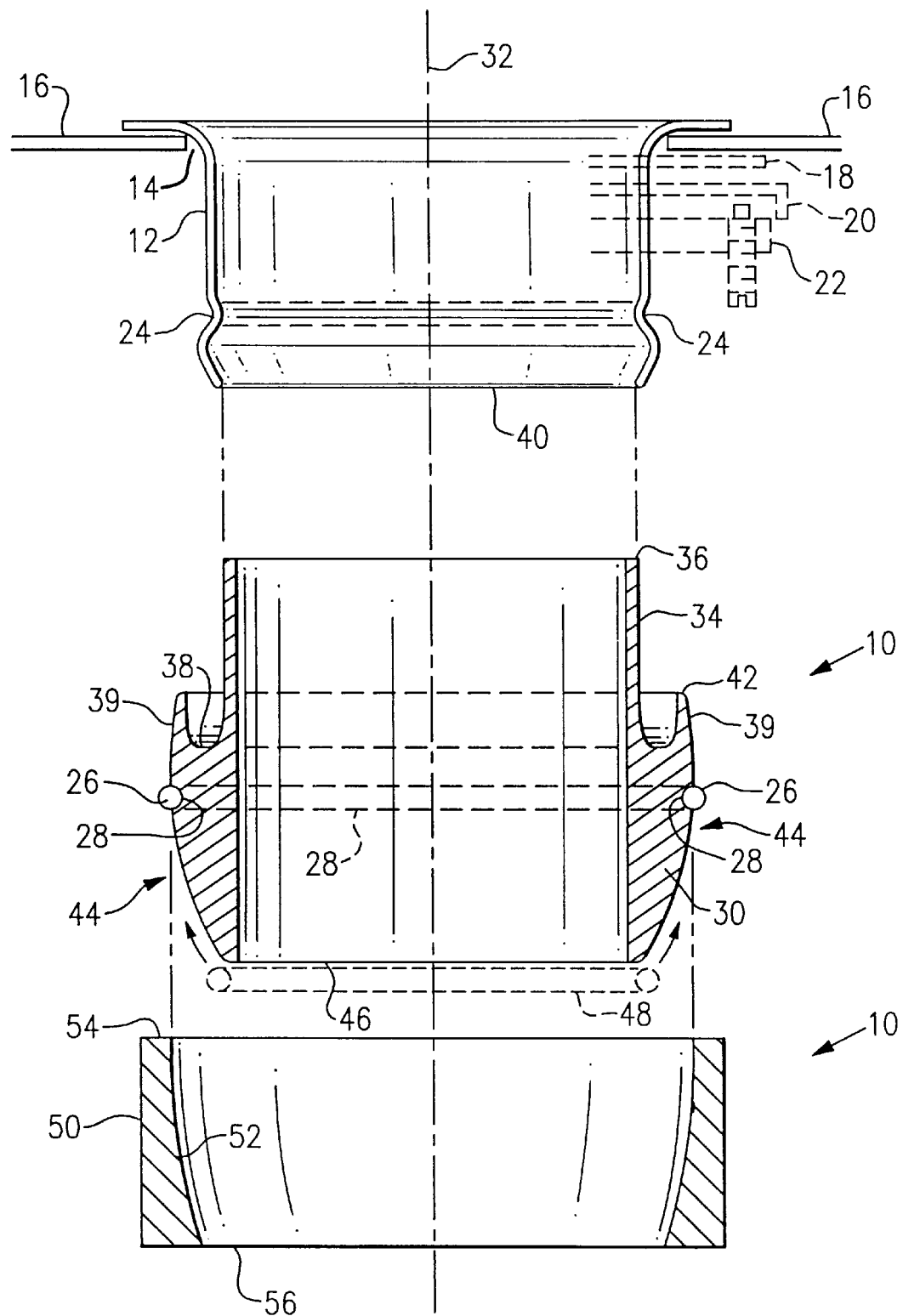
FIG. 1 is a cross sectional view of a garbage disposal split-ring insertion device and sink flange in longitudinal alignment.

Referring to FIG. 1 is shown, a garbage disposal split-ring insertion device, identified in general by the reference numeral 10.

The garbage disposal split-ring insertion device 10 may be formed of any desired material or materials. Plastic, PVC, composite materials such as graphite, and a great many metals are all well suited to form various quality versions of the garbage disposal split-ring insertion device 10.

The use of the garbage disposal split-ring insertion device 10 facilitates the installation of a garbage disposer unit (not shown) including a line of products as are manufactured by Emerson Electric Co. of Racine, Wisconsin and marketed under the tradename, "IN SINK ERATOR", as well as under other tradenames. A sink flange 12 is disposed in a drain hole 14 in a sink 16.

Installation requires that the sink flange 12, as shown, be inserted in the drain hole 14. Additional parts are then added from under the sink 16 over the lower portion of the sink flange 12. These additional parts are partially shown in dashed lines and include a fiber gasket 18, a backup ring 20, and a mounting ring 22.

The sink flange 12 includes a first annular groove 2 4 that forms a recessed circular area around the circumference of the sink flange 12. The sink flange 12 is cylindrical in shape.

The first annular groove 24 is adapted to receive a split-ring 26. The split-ring 26 is sometimes also referred to, in the plumbing industry, as a "snap ring".

The split-ring 26 is shown in the FIG. 1 drawing disposed on a second annular groove 28 of a first cylindrical member 30 of the garbage disposal split-ring insertion device 10. The second annular groove 28 also forms a recessed circular area around the circumference of the garbage disposal split-ring insertion device 10. The second annular groove 28 is used to temporarily retain the split-ring 26 during installation .

The purpose of the garbage disposal split-ring insertion device 10 is to facilitate placement of the split-ring 26 in the first annular groove 24 and this will be discussed in greater detail hereinafter.

The first cylindrical member 30 is also cylindrical in shape and it, like the sink flange 12, share a center longitudinal axis 32 (shown in a dashed line) during installation.

The first cylindrical member 30 includes a first section 34 that includes an upper end 36 and an opposite end at the bottom thereof that terminates in an arc of approximately 180 degrees to form a recess 38. The recess 38 includes an outer portion 39 that extends a predetermined distance generally toward the upper end 36.

The outside diameter of the first section 34 is less than the inside diameter of the bottom of the sink flange 12. The recess 38 is adapted to receive a bottom 40 of the sink flange 12. When the sink flange 12 is disposed properly in the recess 38, an outer edge 42 of the outer portion 39 aligns just below the first annular groove 24 of the sink flange 12.

Therefore, during use, the first section 34 is inserted into the sink flange 12 until the bottom 40 of the sink flange 12 contacts the recess 38. At that time, the sink flange 12 and the first cylindrical member 30 are disposed concentrically with respect to each other and the outer edge 42 is disposed just under the first annular groove 24.

The first cylindrical member 30 includes a first conical taper, identified in general by the reference numeral 44. The outside diameter of the first conical taper 44 (and therefore of the first cylindrical member 30) is greatest at the top near the outer portion 39 and proximate also the second annular groove 28. The second annular groove 28, being a groove, has a slightly lesser diameter than that of the first cylindrical member 30 on either side of the second annular groove 28.

The diameter of the first conical taper 44 is at its smallest at a bottom end 46 that is opposite with respect to the upper end 36. At this location, the diameter permits ready placement of the split-ring 26 over the bottom end 46 when the split-ring 26 is in its normal contracted position.

The split-ring 26 is shown in the contracted position near the bottom end 46 in dashed lines and is identified (i.e., when it is fully contracted) by the reference numeral 48.

The contracted split-ring 48 is then manually pushed upward over the first conical taper 44 by the fingers (not shown) of an installer (not shown) until it expands sufficiently to reach the second annular groove 28, into which it contracts slightly and is temporarily retained.

A second cylindrical member 50 includes a second conical taper 52 on the inside thereof that includes a maximum inside diameter that is greatest at the top and smallest at the bottom.

The second cylindrical member 50 includes a top surface 54 and an opposite bottom surface 56. The greatest inside diameter of the conical taper 52 exceeds the maximum diameter of the first cylindrical member 30. The smallest diameter of the second conical taper 52 is less than the maximum diameter of the first cylindrical member 30.

After the split-ring 26 has been applied over the first conical taper 44 and is retained by the second annular groove 28, the top surface 54 of the second cylindrical member 50 is placed concentrically over the bottom end 46 of the first cylindrical member 30 until the top surface 54 contacts the split-ring 26.

The entire assembly including the first cylindrical member 50, the split-ring 26, and the second cylindrical member 50 are held under the sink 16, preferably being supported in n he palm of a first hand of the installer.

The fiber gasket 18, the backup ring 20, an d the mounting ring 22 are placed over the sink flange 12 and then the upper end 36 of the first cylindrical member 30 is inserted through the bottom 40 of the sink flange 12 until the bottom 40 contacts the recess 38.

Pressure is then applied by the remaining hand of the installer to the top of the sink flange 12 pushing it in a downward direction while continuing to support the garbage disposal split-ring insertion device 10 with the first hand until the split-ring 26 is dislodged from the second annular groove 28 by the top surface 54 of the second cylindrical member 50.

At that time, the split-ring 26 continues to be rapidly displaced upward by the top surface 54 of the second cylindrical member 50. The reason for the rapid displacement is because the force that was required to initially remove the split-ring 26 from the second annular groove 28 continues to be momentarily applied by the installer and that force is greater than is required to slide the split-ring 26 over the outer portion 39 until it exits off the first cylindrical member 30 and begins to contract over the sink flange 12.

As the split-ring 26 contracts it is disposed over the first annular groove 24 and the split-ring 26, therefore, contracts in the first annular groove 24 where it is retained, as desired. The split-ring 26 then provides the necessary bearing surface for the mounting ring 22 to bear against to permit completion of the installation of the garbage disposer unit.

The second conical taper 52 though not required for the garbage disposal split-ring insertion device 10 to function, is useful in that it prevents the second cylindrical member 50 from being displaced too far up and over the first cylindrical member 30. Friction therebetween also tends to retain the first and second cylindrical members 30, 50 proximate to each other when the garbage disposal split-ring insertion device 10 is not in use and this tends to prevent loss of the component parts thereof from occurring.

Figure 2:
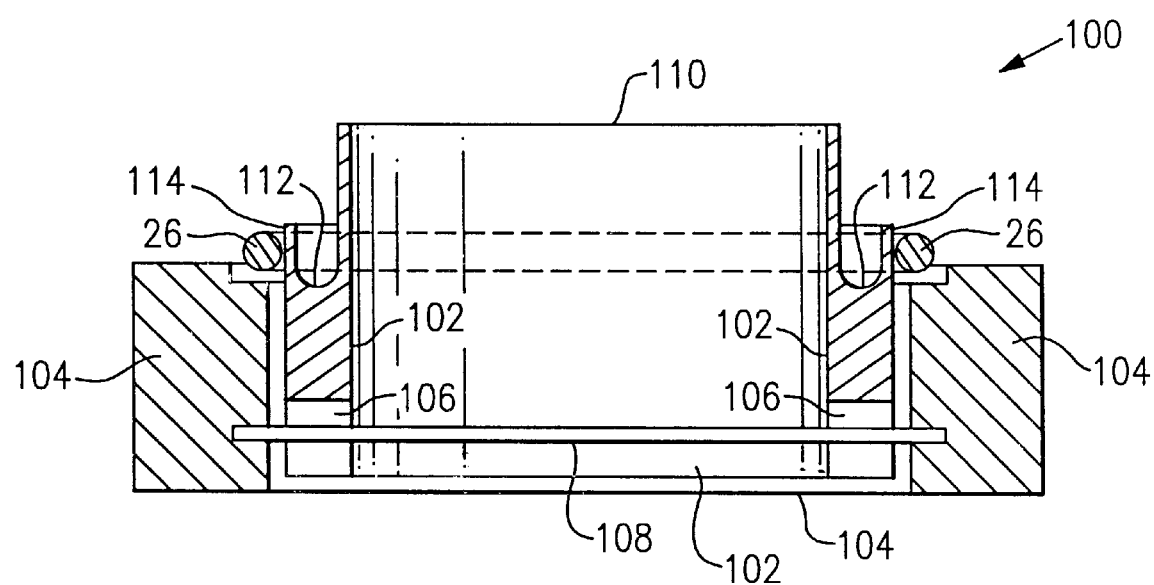
FIG. 2 is a cross sectional view of a modified garbage disposal split-ring insertion device.

Referring now to FIG. 2, a modified garbage disposal split-ring insertion device, identified in general by the reference numeral 100, is shown.

The modified garbage disposal split-ring insertion device 100 includes a first modified cylindrical member 102 disposed concentrically inside of a second modified cylindrical member 104.

The first modified cylindrical member 102 includes a pair of opposite slots 106 through which a rod 108, preferably made of steel, passes. The rod 108 is attached at each end thereof to the second modified cylindrical member 104.

The slots 106 permit a limited range of longitudinal motion to occur between the first modified cylindrical member 102 and the second modified cylindrical member 104 while retaining them, generally, together.

The first modified cylindrical member 102 includes an upper end 110 that is adapted to be inserted in through the bottom of the sink flange 12 (not shown in this drawing). A modified recess 112 is provided to receive the bottom of the sink flange 12.

A modified outer ring 114 is used to retain the split-ring 26 in an extended (i.e., expanded) position.

In use, the upper end 110 is inserted in the sink flange 12 and the installer reaches in through the drain hole 14 (not shown) and through the center area of the first modified cylindrical member 102 and grasps the rod 108 with at least one finger.

While retaining the sink flange 12 at the top (i.e., by applying a downward pressure thereto), the installer pulls up on the rod 108.

This, in turn, displaces the second modified cylindrical member 104 upward with respect to the first cylindrical member 102, thereby displacing the split-ring 26 off of the modified outer ring 114 and into the first annular groove 24 of the sink flange 12.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A garbage disposal split-ring insertion device adapted for depositing a split-ring onto an annular groove of a sink flange, comprising:

(a) a first cylindrical member that includes means for retaining said split-ring in an expanded position thereto and wherein said first cylindrical member includes means for receiving said split-ring when said split-ring is disposed in a contracted position and wherein said first cylindrical member includes means for expanding said split-ring from said contracted position into an expanded position wherein said means for expanding said split-ring includes said first cylindrical member having a first conical taper wherein said first conical taper includes an outside diameter at a bottom end thereof that is less than the inside diameter of said split-ring when said split-ring is disposed in said contracted position and whereby said first conical taper progresses gradually to an outside diameter that is in excess of the outside diameter of the annular ring of said sink flange;

(b) a second cylindrical member that includes a maximum inside diameter that is greater than the maximum outside diameter of said first cylindrical member and wherein said second cylindrical member includes a second conical taper, wherein said second conical taper includes a maximum inside diameter that exceeds the maximum outside diameter of said first cylindrical member at one end thereof and wherein said second conical taper includes a minimum inside diameter at an opposite end thereof that is less than the maximum outside diameter of said first conical member; and (c) means for concentrically aligning said first cylindrical member proximate to said sink flange and said second cylindrical member with respect to said first cylindrical member;

wherein said second cylindrical member is adapted to be displaced longitudinally with respect to said first cylindrical member sufficient to urge said split-ring off of said first cylindrical member and into said annular groove and wherein said minimum inside diameter of said second conical taper limits the amount said second cylindrical member is adapted to be displaced longitudinally subsequent to the urging of said split-ring off of said first cylindrical member.

2. The device of claim 1 wherein said first cylindrical member includes a second annular groove, said second annular groove adapted to temporarily retain said split ring in an expanded position.

3. The device of claim 2 including means for placing said an upper portion of said first cylindrical member proximate said annular groove.

4. The device of claim 3 wherein said upper portion is disposed under said annular groove of said sink flange.

5. The device of claim 1 wherein said means for retaining said split-ring in an expanded position includes a second annular ring disposed in said first cylindrical member.

6. The device of claim 5 wherein said maximum inside diameter of said second conical taper is less than the maximum outside diameter of said split-ring when said split-ring is disposed in said second annular ring.

7. The device of claim 1 wherein said means for concentrically aligning includes means for placing an upper portion of said first cylindrical member proximate said annular groove.

8. A method for installing a split-ring onto an annular groove of a sink flange, comprising:

(a) providing a first cylindrical member that is adapted to retain said split-ring in an expanded position thereto;

(b) providing a second cylindrical member that is adapted to be placed concentrically over said first cylindrical member and which is adapted for longitudinal motion sufficient to displace said split-ring from said expanded position off of said first cylindrical member;

(c) placing said first cylindrical member in concentric alignment with respect to said sink flange;

(d) displacing said second cylindrical member with respect to said first cylindrical member sufficient to urge said split-ring off of said first cylindrical member and onto said sink flange; and (e) wherein the step of displacing said second cylindrical member with respect to said first cylindrical member includes the step of pulling up said second cylindrical member by reaching through said sink flange and grasping a portion of said second cylindrical member and pulling it upwards while retaining said sink flange in position.

9. The method of claim 8 including the step of placing a portion of said first cylindrical member proximate said annular groove so that when said split-ring is urged off of said first cylindrical member and onto said sink flange it contracts into position in said annular groove.

10. The method of claim 8 wherein the step of displacing said second cylindrical member with respect to said first cylindrical member includes the step of applying a downward force to said sink flange while applying an upward force from underneath to said second cylindrical member that is sufficient to retain said second cylindrical member in position as said sink flange is urged in a downward direction.

* * * * *